United States Patent [19]
Harris

[11] 3,848,493
[45] Nov. 19, 1974

[54] PIVOTAL ARM BAND SAW

[76] Inventor: Gerald R. Harris, Livermore, Calif.

[22] Filed: Aug. 8, 1972

[21] Appl. No.: 278,851

Related U.S. Application Data

[62] Division of Ser. No. 86,732, Nov. 4, 1970, Pat. No. 3,682,030.

[52] U.S. Cl.......................... 83/168, 83/820, 83/169
[51] Int. Cl... B27b 13/12, B23d 55/08, B27b 13/10
[58] Field of Search....................... 83/169, 168, 820

[56] References Cited
UNITED STATES PATENTS
| | | | |
|---|---|---|---|
| 3,104,575 | 9/1963 | Robinson | 83/168 |
| 3,534,647 | 10/1970 | Mills | 83/820 |

*Primary Examiner*—Donald R. Schran
*Attorney, Agent, or Firm*—Warren, Rubin & Chickering

[57] ABSTRACT

A band saw having a pivotal arm supported for articulation on both sides of the saw blade and preferably above the surface upon which the work is to be cut is disclosed. The band saw includes a frusto-conical drive wheel and means for guiding the saw blade in slip condition on said drive wheel. Also disclosed are guide means carried by the pivoted arm and formed to direct coolant on the saw blade as well as impart a positive camber to the blade. The saw is provided with a fluid activated controlling means for raising and lowering the pivotal arm which includes a combined gas-liquid system in which the flow rates of the gas and liquid may be pre-selected to control the rate of descent of the arm.

2 Claims, 13 Drawing Figures

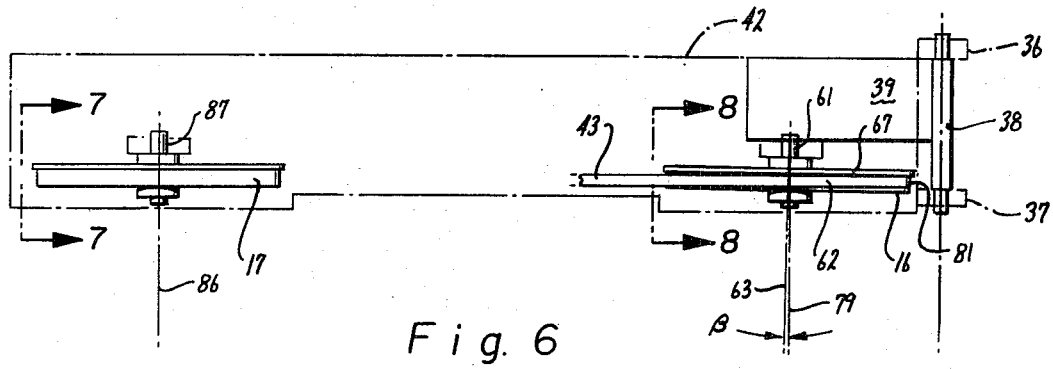
Fig. 6
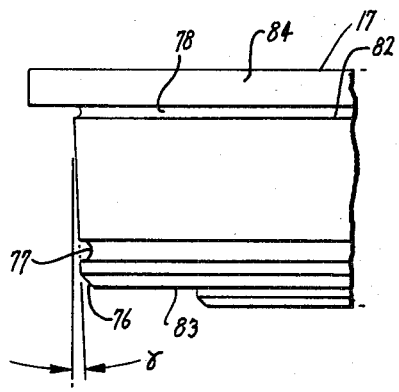
Fig. 7
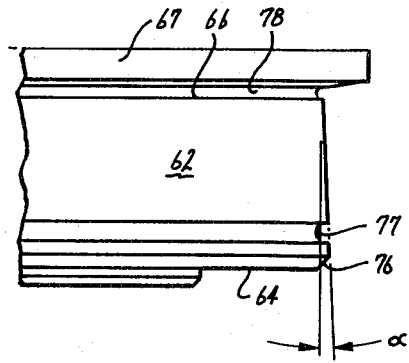
Fig. 8
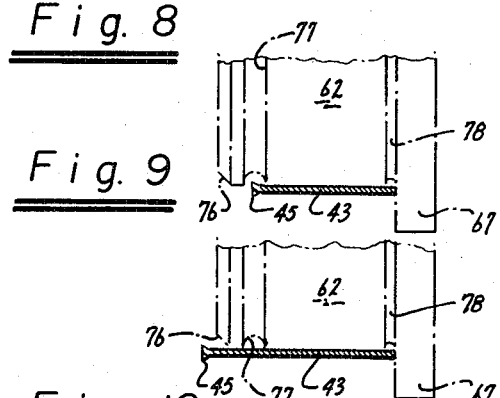
Fig. 9
Fig. 10

PIVOTAL ARM BAND SAW

This is a division of application Ser. No. 086,732, filed Nov. 4, 1970, now U.S. Pat. No. 3,682,030.

BACKGROUND OF THE INVENTION

The present invention relates in general to band saws which employ a continuous loop-type blade and, more particularly, relates to band saws having a blade carrying arm which is pivotally secured to a support for raising and lowering of the same during the cutting process.

A number of different uses for the continuous loop band saw have evolved in industry today, and a number of different band saw constructions have similarly been developed. It has been a constant goal of manufacturers of sawing equipment to develop saws which will cut with a high degree of accuracy. Therefore, problems such as wandering of the saw blade or misalignment of the blade carrying arm during the cutting process can be quite serious and result in very unsatisfactory performance of the saw.

One approach to the construction of a band saw which will produce a relatively accurate saw cut has been to employ a saw arm which is raised and lowered on four or more posts in a manner similar to an elevator. This construction has enabled band saws to be produced which are relatively accurate in their cutting capability, but the raising and lowering mechanisms have been found to be expensive to manufacture and sometimes inconvenient to use.

Another approach has been to employ a pivoted arm or hinge-type band saw, which is secured to a support at one end of the arm for arcuate motion during the cutting process. While this approach has resulted in a band saw which is much less expensive to manufacture, the cutting accuracy of the pivotal or hinge-type band saw has suffered. One pivotal arm band saw construction which is in widespread use mounts the saw blade carrying arm to the supporting frame in a manner which induces a moment in the pivotal shaft causing the shaft to be slightly angularly displaced during cutting. While this slight displacement is tolerable in some operations, for others the arm mounting construction is very unsatisfactory and results in crooked cutting of the work piece. In addition, it has been common practice to locate the hinge or pivotal mounting for the arm to the support at a position substantially below the work surface on which the piece is being cut. As will be more fully explained hereinafter, said saw configurations result in a variable and undesirable downward force on the cutting blade, which is either attempted to be compensated for by further apparatus or results in undesirable cutting rates and blade breakage.

Certain other problems have been frequently encountered with pivotal arm band saws. It has been found to be difficult to maintain the continuous loop band saw blade on the drive and idler wheels. One approach to a solution to this problem has been to construct wheels which are formed to prevent the band saw blade from climbing off the wheels. The band saw blade may, however, also come off the wheels if the drive wheel goes into slip-condition. Thus, when there is a heavy load on the saw blade, it is possible for the drive wheel to begin to slip relative to the band saw blade which it is frictionally driving. When this occurs, the blade on present band saws will very often slide off the wheels. There have also been numerous problems in twisting of the band saw blade intermediately of the wheels and guiding the same for proper cutting. Similarly, the distribution of coolant over the band saw blade in the area of cutting has been very difficult, since an improper distribution of the coolant material will result in inaccurate cutting. Some guide constructions induce localized stress forces in the continuous loop saw blade which result in fatigue and breaking of the saw blade. Finally, a variety of control systems have been employed in seeking to control the rate of descent of the pivotal arm saw blade. Many of these systems are either very complex in nature or are not easily and conveniently adjustable to the different rate of arm descent.

Accordingly, it is an object of the present invention to provide a pivotal arm band saw construction which results in improved accuracy and uniformity of cut of the saw blade.

It is another object of the present invention to provide a pivotal arm band saw construction in which the rate of cutting of the saw can be accurately controlled and readily varied.

It is another object of the present invention to provide a pivotal arm band saw in which the continuous loop saw blade is retained on the drive and idler wheels through a greater variety of operating conditions.

It is still a further object of the present invention to provide a pivotal arm band saw in which the saw blade is cooled by a liquid coolant and guided for uniform cutting while minimizing the fatigue experienced by the blade during cutting.

It is another object of the present invention to provide a pivotal arm band saw which is relatively easy to manufacture and enables accurate and reproducible saw cuts, is easy to maintain and repair, and may be easily adjusted to a variety of operating conditions.

The pivotal arm band saw of the present invention has further objects and features of advantage which will be more fully set forth hereinafter.

SUMMARY OF THE INVENTION

The pivotal arm band saw of the present invention is comprised briefly of a support, an arm having a saw blade carrying portion, and pivotal connection means extending transversely of the arm and pivotally securing the arm to the support for guided arcuate motion in a single plane, a pair of wheels formed for receipt and carrying of a continuous loop band saw blade, each of the wheels being rotatably mounted to the carrying portion of the arm in relatively spaced positions thereon, the connection means being formed to pivotally secure the arm to the support at laterally spaced positions on the support disposed on both sides of the plane of travel of the saw blade through the work piece. The pivotal connection is further preferably above the work supporting surface on which material is cut.

In another aspect of the present invention, a frustoconical driving wheel is employed having a saw blade retaining means position adjacent the small diameter end of the frustoconical peripheral surface of the driving wheel to engage the smooth back edge of the saw blade. The blade retaining means is preferably comprised of a flange fixed to the small diameter side of the wheel.

In still another aspect of the present invention, saw blade guide means are provided which are formed for the replacement of saw blade engaging guide elements and to direct a liquid coolant down upon the back edge of the saw blade. The guide elements further preferably impart a positive camber to the saw blade to reduce fatiguing.

In still another aspect of the present invention, fluid activated control means including a gas-liquid system for raising and controlling the rate of descent of the pivotal arm is provided.

BRIEF DESCRIPTION OF THE DRAWINGS

FIG. 6 is an enlarged, fragramentary top view of the pivotal arm illustrating a drive wheel construction in accordance with the present invention.

FIG. 7 is a further enlarged, fragramentary view of an idler wheel constructed in accordance with the present invention.

FIG. 8 is a further enlarged, fragramentary view of a drive wheel constructed in accordance with the present invention.

FIG. 9 is an enlarged, fragramentary view of a drive wheel constructed in accordance with the present invention with a band saw blade positioned thereon.

FIG. 10 is another enlarged, fragramentary view of a drive wheel constructed in accordance with the present invention with a band saw blade positioned thereon.

DESCRIPTION OF THE PREFERRED EMBODIMENTS

Figure 1:
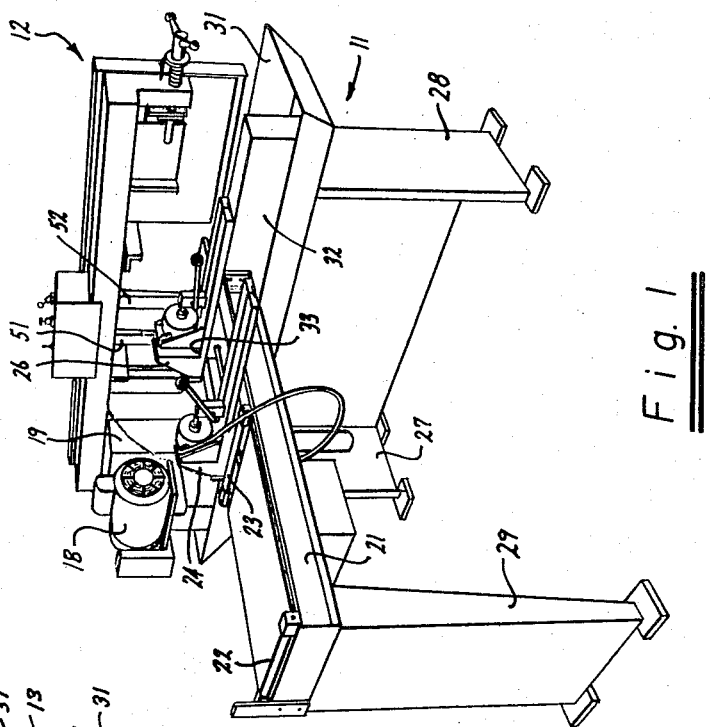
FIG. 1 is a side perspective view of a pivotal arm band saw constructed in accordance with the present invention.
Figure 2:
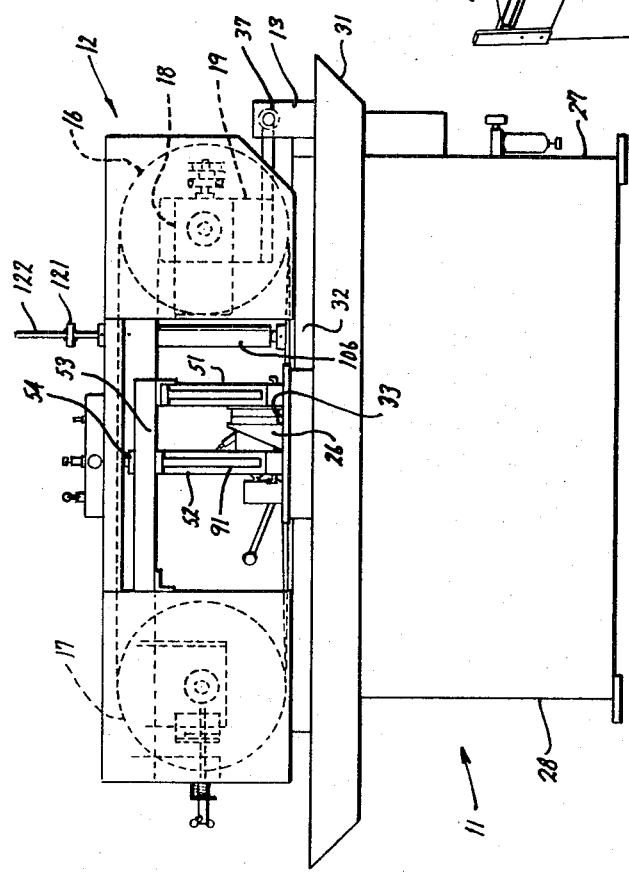
FIG. 2 is a side elevational view of the band saw of FIG. 1.
Figure 3:
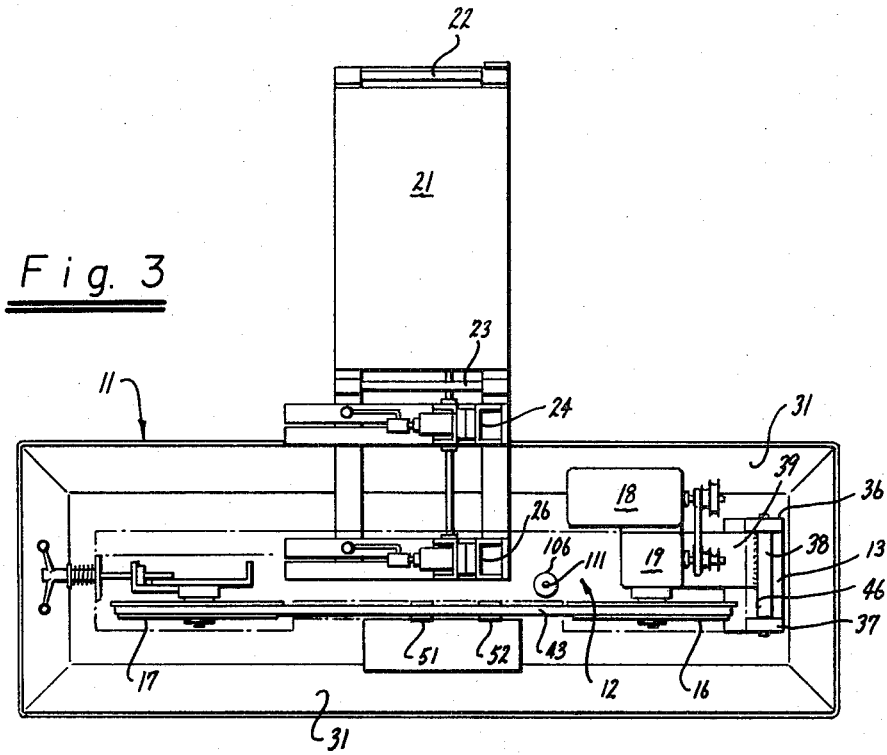
FIG. 3 is a top plan view of the band saw of FIG. 1.

Referring to FIGS. 1, 2, and 3, the basic elements of the pivotal arm band saw of the present invention can be examined. The band saw includes a support, generally designated 11, to which an arm, generally designated 12, is pivotally secured by pivotal mounting means 13. Rotatably mounted to arm 12 are a pair of wheels 16 and 17, with wheel 16 being connected to motor 18 through power drive speed reducer 19. As illustrated in the drawings, frame 11 includes feed table 21 having work supporting rollers 22 and 23 and work advancing vices 24 and 26, preferably formed as described in my previously issued U.S. Pat. No. 3,504,585. Support frame 11 further includes upstanding legs 27, 28 and 29 as well as a chip and coolant receiving tray 31. Vice 26 is mounted on top of bench 32 over the coolant and chip tray and provides a work supporting surface 33, best seen in FIG. 2.

In order to insure and improve the cutting characteristics of the pivotal arm band saw, the saw of the present invention is constructed with a pivotal mounting to the frame which minimizes possible angular displacements of the arm relative to the frame during cutting. The mounting structure of the present invention may best be seen by reference to FIGS. 3, 4, and 5. Pivotal connection means 13 may be seen to be comprised of a pair of bearing housings 36 and 37 and transversely extending shaft 38 mounted between the bearing housings for rotation therein. As may be seen in FIG. 1, the bearing housings 36 and 37 are secured to frame 11 for support of the pivotal arm. Extending from and secured to shaft 38 is a portion 39 of arm 12, which is preferably welded by welds 41 to shaft 38. Portion 39 is further connected to a C-shaped arm body 42 upon which wheels 16 and 17 are rotatably mounted.

Figure 5:
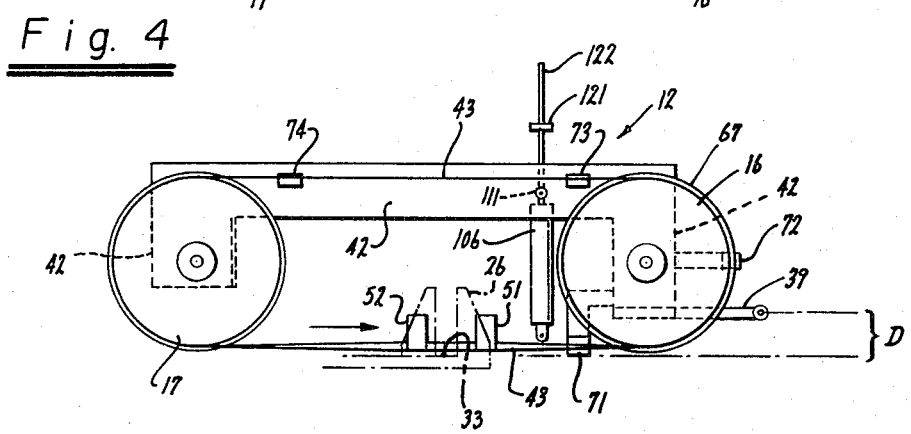
FIG. 5 is a side elevational view of the pivotal arm illustrated in FIG. 4.

Thus, as best may be seen in FIG. 5, arm 12 includes portion 39 and C-shape portion 42 which are fixedly secured to shaft 38 for pivotal motion as mounted to frame 11.

Figure 4:
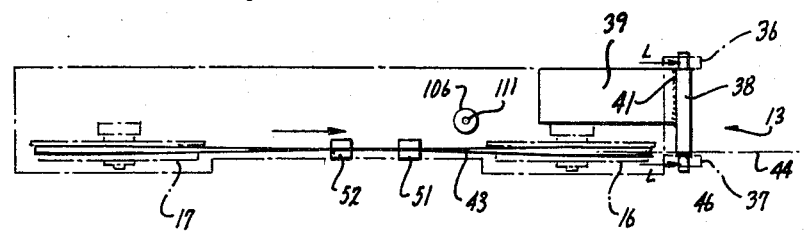
FIG. 4 is a fragmentary top view of the pivotal arm as illustrated in FIG. 3.

It is a feature of the pivotal arm band saw of the present invention that the bearing housings 36 and 37 are positioned in a manner to improve the accuracy of the saw cuts which can be achieved with the present pivotal band saw. As best may be seen in FIG. 4, drive wheels 16 and 17 are in general alignment and have continuous loop saw blade 43 mounted thereon and extended therebetween. The wheels 16 and 17 and saw blade 43, as twisted by the guides for cutting, are all disposed substantially along plane 44, the plane of rotation of the wheels and travel of blade 43 through the work piece. Bearing housings 36 and 37 may be seen to be disposed on either side of plane 44 to thus secure the pivotal arm 12 to frame 11 from positions laterally spaced on both sides of the plane travel of said saw blade and, in this case, the plane of rotation of the wheels. The effect of so positioning bearing housings 36 and 37 is very important. As the saw blade passes through the work piece, the cutting force is transferred from the saw blade to the wheels and from there to portion 39 of the arm. The force induced in portion 39 of the arm is resisted by bearing forces in housings 36 and 37. When the housings 36 and 37 are positioned on both sides of plane 44, the bearing housings 36 and 37 both exert forces L in the direction indicated in FIG. 4 against shaft 38. This loading force L is induced when the blade travels as indicated by the arrow in FIGS. 4 and 5. If the bearing housing 37 were disposed on the same side of plane 44 as is housing 36, an entirely different set of reaction forces would be induced in the bearing housings. More particularly, the load force L on bearing housing 37 when positioned on the other side of plane 44 would be in the opposite direction as illustrated in FIG. 4. This type of pivotal mounting is common in present pivotal arm band saws. When the loading force in housing 37 is in the opposite direction than that shown in FIG. 4, there exists a coupling of the loading forces which results in angular displacements of shaft 38. Thus, shaft 38 tends to twist in the bearing housings and arm 12 correspondingly is subject to angular deflection about a vertical axis. Since it is impossible to completely eliminate all play from between the bearing housings and shaft 38, such angular deflection, when multiplied by the length of arm 12, can result in substantial inaccuracy in cutting at the point at which the saw blade engages the work. In the present invention the pivotal connection means is formed so that any play between housings 36 and 37 and the shaft 38 does not result in an angular displacement of arm 12. Instead any displacement is generally aligned with the place of cutting of the blade, which does not result in an inaccurate saw cut.

Since it is possible to mount wheels 16 and 17 at an angle to plane 44 while still twisting blade 43 to cut along plane 44, the plane of rotation of the wheels and the plane of travel of the saw blade through the work piece may not coincide. Since the arm is loaded by the force on the blade, the bearing housings should be on both sides of the blade. It should be further noted that plane 44 need not be verticle.

It is a further feature of the pivotal arm band saw of the present invention that the connection means to support 11 is positioned in a manner which tends to minimize the differences in cutting rate and force on the cutting blade which result by reason of the inherent arcuate motion of saws of this type. As may best be seen in FIG 5, pivotal shaft 38 is mounted in housings 36 and 37 at a distance D above generally horizontally extending work supporting surface 33. Additionally, the distance D is preferably selected to be equal to about one half the thickness of the material to be cut. This distance can be approximated for a given size band saw and an average thickness work piece. In prior band saw constructions the pivotal arm has most frequently affixed at or below the work supporting surface. The positioning of the pivotal mounting means at or below the work supporting surface results in the downward gravitational forces on the pivotal arm, and thus the saw blade, increasing substantially as the saw blade is lowered from a full raised position to a full lowered position during cutting. Thus, when the saw blade is in a raised position, the downward gravitational forces are at a minimum while when it is in the lowered position the forces are at a maximum. The change in the downward force is a function of the cosine of the angle of the pivotal arm to the horizon. When the pivotal arm is pivoted from a position below the work supporting surface, the cosine of the angle varies substantially from the full raised to the full lowered position. Conversely, however, the positioning of the pivotal arm as illustrated in the present invention results in a relatively uniform downward gravitational force being applied to the saw blade. This is particularly true where the connection means secures the arm to the support at a distance above the support surface equal to about one half of the material to be cut. The change in cosine and therefore the change in downward gravitational force is minimized when the pivotal connection means is positioned at a distance equal to about one half the thickness of the material to be cut.

The distance D above the support surface can be preset to approximate the optimum distance for expected use of the band saw. Pivotal arm or hinged band saws normally employ a continuous loop band saw blade having a height from the cutting teeth to the smooth back edge in the range of about 1/2 inch to about 1¼ inches. Occasionally, even band saw blades which are 2 inches in height may be used. The height of the band saw blade in large part determines the rate at which a work piece can be cut, which in turn roughly determines the maximum nominal diameter piece which can be cut at maximum saw blade efficiency. For example, for a 1/2 inch height saw blade maximum efficiency of cutting will be achieved if the work piece has a diameter of about three inches. Accordingly, the distance D above the work surface for a 1/2 inch saw blade for minimization of the cosine effect would be 1½ inches or 1/2 of the 3 inch diameter piece being cut. As the saw blade height is increased by 1/4 inch to 3/4 inches the diameter at which maximum cutting efficiency occurs is increased by 2 inches from 3 inches to 5 inches. Therefore, the distance D will be increased by 1 inch to maintain a minimum cosine effect. It has been found that for saw blade height above 1/2 inch, at which the distance D is optimally 1½ inches, each increment of saw blade height of 1/2 inch increases the distance D by about 1 inch in order that the saw may be set up to cut at maximum efficiency with a minimization of the effect of the change in the location of the center of gravity of the saw arm relative to the pivot during cutting. Minimization of the cosine effect further allows the guides to be set closer together, which in turn insures more accurate cutting and less blade fatigue.

In order to further minimize the effect of the change in the location of the center of gravity of pivotal arm 12 during arcuate motion, it is a further feature of the band saw of the present invention that mounting means 13 be positioned at a substantial distance from the area in which the cutting occurs. As will be seen in FIGS. 3, 4, and 5, pivotal shaft 38 is positioned so that it passes transversely of drive wheel 16 with a portion 46 of shaft 38 maintained in substantial clearance from the peripheral edge of drive wheel 16. Such clearance allows saw blade 43 to be conveniently mounted on the drive and idler wheels by slipping the blade on the wheels as is commonly done in existing band saws. Such clearance is also necessary in order to have the bearing housing 37 positioned on the side of plane 44 as above described. Additionally, however, the positioning of shaft 38 beyond a plane (not shown) passing perpendicular to support surface 33 tangential to the periphery of wheel 16 has the effect of increasing the distance between pivotal shaft 38 and vice 26 over pivotal arm saws previously employed. This increase in distance has a twofold beneficial effect. First, a greater distance results in greater vertical displacement at vice 26 for a given angle of pivot of arm 12. Therefore, one need only raise the arm 12 to a relatively small arcuate angle to accommodate a large work piece. The small angular displacement results again in assisting the minimization of the change in location of the center of gravity of the arm which cooperates with the positioning of the arm above work surface 33, as previously explained. Secondly, and very importantly, increasing the distance between the pivotal shaft and the work holding vice has the effect of allowing the saw blade guide members 51 and 52, best seen in FIG. 2, to be set more closely together to conform to the thickness of the work piece. Saw blade members 51 and 52 are secured to arm 12 for arcuate motion therewith. Accordingly, when the arm must pass through a substantial arc in order to cut the work piece, the movable guide member 52 must be positioned at a greater distance from fixed guide member 51 than is necessary for smaller angular displacements. As the distance between the guide members increases, the saw blade is subjected to greater bending forces and may uncontrollably and unpredictably be displaced during cutting. Therefore, increasing the distance from the pivot to the cutting area decreases the angle through which the arm must be articulated during cutting and allows the guides to be set more closely together for better support of the saw blade throughout the cut.

In a further effort to improve the overall performance of pivotal-type band saws, it is a feature of another aspect of the present invention to provide a band saw drive wheel which affords a more reliable and trouble free operation of the band saw. The drive wheel construction of the present invention can best be understood by reference to FIGS. 6 and 8 in which drive wheel 16 can be seen to be rotatably mounted to arm 12 by shaft 61. The drive wheel is formed with a generally circular wheel body which terminates in a peripheral saw blade engaging surface 62. Surface 62 is formed as a frusto-conical surface about the central axis 63 of the wheel. As best may be seen in FIG. 8, the wheel tapers from large diameter side 64 to a small diameter side 66, with the angle of taper designated as alpha ($\alpha$). Peripheral surface 62 has a height along axis 63 sufficient to frictionally engage a substantial portion of one of the flat blade sides in order to dry the blade. As shown in FIGS. 6 and 7 the small diameter end 66 of the drive wheel is provided with a saw blade retaining means in the form of a side flange element 67 secured to and extending from the drive wheel radially beyond surface 62.

It is well known in the band saw art that the band saw blade will tend to climb up toward the large diameter end of a frusto-conical drive wheel. Accordingly, previous drive wheels have included a flange on the large diameter end of the drive wheel to limit the upward climbing action of the saw blade. While this approach is effective, wheels constructed in this manner have been found to have another defect. When the load on the saw blade becomes high, the blade may begin to slip relative to the drive wheel and in this "slip" condition the blade tends to move rapidly toward the small diameter end of the wheel. This movement in the slip condition on previous drive wheels has often resulted in the band saw jumping off the drive wheel. The drive wheel of the present invention is constructed to take advantage of the natural climbing tendancy of the saw blade on the frusto-conical surface and moreover to guard against jumping of the blade from the drive wheel if a slip condition occurs. Thus, a saw blade retaining means, such as flange 67, is positioned adjacent the small diameter end of the drive wheel. During normal operation, the saw blade will climb toward the large diameter end 64 of the drive wheel until it reaches a stable position thereon, as determined by the position of the fixed guide which determines where the blade enters the wheel. If the loading becomes high enough so that the blade overcomes the frictional forces along surface 62, the blade will go into slip condition and drop towards the small diameter end of the wheel only to be retained on the wheel by flange 67.

An alternate construction of the blade retaining means suitable for use in the present invention may be seen in FIG. 5. While flange 67 is shown in FIG. 5, it is also possible to eliminate flange 67 and substitute therefore guide blocks 71, 72, and 73. These guide blocks would be mounted to arm 12 for arcuate motion therewith so as to be constantly positioned adjacent the small diameter end 66 of the driving wheel. If the retaining means is to be comprised of guide blocks instead of a flange rotating with the wheel, guide block 71 is the most important block since it is positioned adjacent the point at which the blade first engages the drive wheel. This guide block will determine where the blade first becomes engaged by the guide to correspondingly determine its engagement over the periphery of the wheel. Guide blocks 72 and 73 are preferable since they would assist in retaining the blade on the drive wheel in the event of a slip condition. In addition, a guide block 74 may be used adjacent idler wheel 17.

It is a further feature of the present invention to provide a drive wheel which will accommodate saw blades of various heights. As best may be seen in FIGS. 7 through 10, the drive and idler wheels are preferably formed with a bevelled edge 76 and an axially spaced peripheral groove 77, both of which are formed to accommodate the teeth 45 of saw blade 43. As may be seen in FIGS. 9 and 10 the teeth 45 of the saw blade are typically formed in a manner so that they extend inwardly and would engage the peripheral surface 62 of the wheel, causing wear of the wheel and damage to the teeth, if it were not for bevelled edge 76 and groove 77. Additionally, it is preferable that the drive and idler wheels be formed with a second groove and that flange 67 be tapered as shown.

It is an important feature of the present invention to provide a drive wheel construction which minimizes the strain on the saw blade to thereby reduce the incident of saw blade breakage. It has been found that combining the frusto-conical saw blade construction as here and above described with the skewing of the axis 63 of shaft 61 results in improved stability of the saw blade on the drive wheel and reduces the strain and wear on the blade. Axis 63 of shaft 61 is illustrated in FIG. 6 as being skewed from a normal position 79 by the angle beta ($\beta$). Skewing the axis 63 to the angle beta ($\beta$) results in the plane of rotation of wheel 16 being skewed or rotated about a vertical axis to the plane of travel of saw blade 43. Thus, the flange 67 at the small diameter end of the drive heel may be seen in FIG. 6 to be displaced away from saw blade 43. Displacement of flange 67 away from saw blade 43 at the points of engagement and disengagement of the saw blade has the beneficial effect of avoiding rubbing the edge of the saw blade with flange 37. In prior wheel constructions such rubbing has been found to fatigue the saw blade and to some extent the drive wheel. It should be noted further that skewing the plane of rotation of the drive wheel through angle beta ($\beta$) has the effect, when combined with the angle alpha ($\alpha$) of frustoconical surface 62, of orienting side 81 of the drive wheel almost perpendicular to the plane of travel of the saw blade. This is important since without the skewed plane of rotation, angle alpha ($\alpha$) will tend to cause the saw blade to be slightly elongated adjacent the teeth which would in turn induce greater stress in the side of the blade adjacent the teeth and the smooth back edge.

It is a further feature of the present invention to provide an idler wheel which is similarly frusto-conical and has a large diameter end 82 and a small diameter end 83. The idler wheel, however, is formed with a flange 84 adjacent the large diameter end. Flange 84 is in general alignment with flange 67, but wheel 17 is formed in a manner as has been previously attempted for drove wheels. Since wheel 17 is not a drive wheel, this construction is adequate for idler wheels since the slipping condition occurs only at drive wheel 16. Moreover, the combination of an idler wheel with a flange at the large diameter end and a drive wheel with a flange at the small diameter end tends to reduce the incidents of slipping and virtually completely eliminate jumping of the saw blade from the drive and idler wheels. It should be noted that the central axis 86 of shaft 87 is approximately normal to the line of travel of blade 43 for idler wheel 17.

In order to provide further for accurate saw blade cutting, it is a further feature of another aspect of the present invention to form guides 51 and 52 in a manner enhancing the uniformity of the saw blade cuts. As may be seen in FIG. 2, saw blade guide means is comprised of guiding elements 51 and 52 which are mounted on bar member 53. Guide 51 is fixedly secured to bar member 53 while guide 52 is formed with means 54 for allowing selective clamping of guide member 52 at various positions along bar 53. Thus, guide member 52 is a movable guide which can be laterally adjusted along bar 53 in order to accommodate various width work pieces. As is common practice, guide members 52 and 53 impart a twist, usually about ninety degrees, to saw blade 43 in order that the saw blade at the area of cutting will be parallel to the arcuate motion of arm 12. Since the guides impart a twist to blade 43 and such twisting can induce stress concentrations and fatiguing, it is another feature of the present invention to position a fixed guide between wheels 16 and 17 at a distance from wheel 17 such that when movable guide 52 is separated from fixed guide 51 by distance equal to about four to 12 times the height of the saw blade, movable guide 52 will be spaced approximately the same distance from wheel 17 as fixed guide 51 is from wheel 16. Thus, the degree of twisting of the saw blade from idler wheel 17 to movable guide 52 and from fixed guide 51 to drive wheel 16 will be approximately equal. Fatiguing of the saw blade as a result of the twist imparted therein is, therefore, minimized by balancing the amount of twisting.

Figure 11:
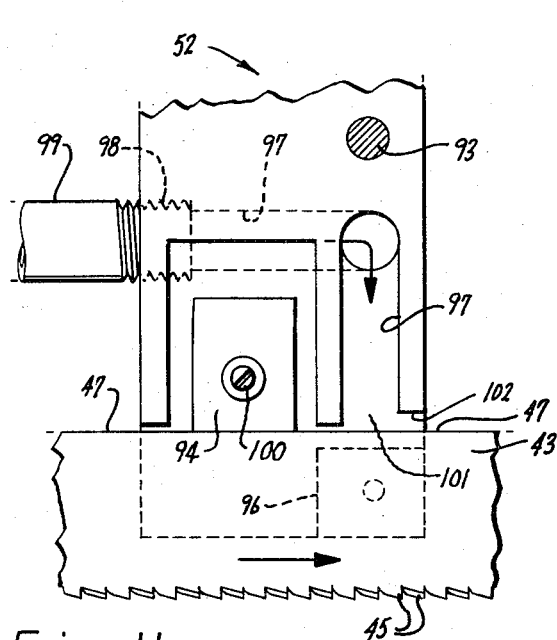
FIG. 11 is an enlarged, fragramentary side elevational view of a guide member constructed in accordance with the present invention.
Figure 12:
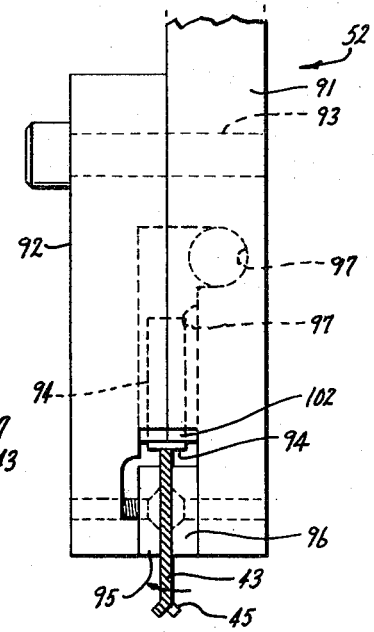
FIG. 12 is an enlarged, fragramentary end elevational view of the guide means of FIG. 11.

A more detailed illustration of the guide members of the present invention is shown in FIGS. 11 and 12. In order to effect cooling of the saw blade it is preferable that the saw blade have a coolant passed over the same in the area of the work piece to transfer heat and convey chips or particles which are cut away from the work piece. The guide element shown in FIGS. 11 and 12 is formed for distribution of coolant over the saw blade and additionally to provide bearing surfaces which guide the blade to a vertical position between the guide members. The guide member illustrated is designated as the movable member 52, although the fixed guide member is preferably similarly formed. Guide member 52 is comprised of a downwardly extending arm 91 which is secured at the upper end to bar 53. Detachably mounted on arm 91 is a second piece or member 92, which is held to the member by a bolt 93. The lower ends of pieces 91 and 92 have guide elements 94, 95, and 96 removably secured thereto. The guide elements may be carbide guides which are formed for sliding engagement with the smooth sides of the saw blade. As will be seen, guide elements 95 and 96 engage the sides of the saw blade, while guide element 94 engages the smooth back edge 47 of the saw blade. Element 94 is further preferably eccentrically mounted to member 52 by fastener 100. This allows element 94 to be inverted to displace blade 43 downwardly when smaller blades are used to be certain to impart a positive camber (discussed in detail below).

In order to provide a coolant flow over blade 43, it is preferable that the two pieces of the guide member be formed with a coolant channel 97. As will be seen from the drawings, coolant channel 97 is first formed as a bore in member 91 having a threaded end 98 to receive coolant conduit 99. Channel 97 then continues to be formed in both pieces 91 and 92 of the guide member and terminates in discharge opening 101. As thus formed, the coolant will have imparted thereto a substantial downward velocity as it travels through channel 97 and is discharged over the back smooth edge 47 of the saw blade. It is important to note that the discharge opening 101 is positioned over the back edge of the saw blade so that a substantial and equal amount of the discharge opening is positioned on either side of the blade. This tends to cause the blade to run evenly between the guide elements 95 and 96, as opposed to being displaced preferentially towards one of the guide elements. In addition, discharge opening 101 is preferably relieved at 102 in order that coolant will tend to travel in the direction of travel of saw blade 43, as indicated by the arrow.

In a further effort to enhance characteristics of the band saw of the present invention and particularly to reduce fatiguing of the saw blade, it is a feature of the present invention that the guide elements and guide members be formed in position so as to impart a positive camber to the saw blade. The concept of camber can best by understood by reference to FIG. 5. If the saw blade is extended between wheels 16 and 17 without a twist induced therein by the guide members, the saw blade will assume a position approximately on a line tangent to both of the wheels. Upon twisting of the saw blade, however, the back edge 47 will rise above the tangential line and the teeth will drop below, with the middle of the saw blade laying substantially along the tangential line between the drive wheel and idler wheel. If the saw blade is supported between the guide member in this position, the cutting force will tend to cause the blade to be upwardly displaced so that the center of the blade is now above the tangent between the two wheels. Such displacement is often referred to as a negative camber. As will be appreciated, a negative camber induces stress forces on the back side 47 of the saw blade. In order to attempt to avoid this phenomenon, the guide element 94 and the length of arm 91 are selected so that the center of blade 43 is displaced below the tangent between the drive and idler wheels to thereby impart a positive camber to the saw blade. It is interesting to note further that since the guide bar 53 on which movable guide 52 is mounted is horizontal and therefore parallel to a line drawn tangentially between the guide and idler wheels, guide member 52 will maintain a positive camber for all settings along bar 53. Moreover, as the guide member 52 is moved toward idler wheel 17 the positive camber of the saw blade is increased. This is important since movement toward idler wheel 17 results in a greater span between the guide member and a greater opportunity for upward bending of the saw blade and stress concentrations in the back edge thereof.

It has been common practice in existing pivotal arm band saws to automate the raising and lowering of the pivotal arm to some degree. Some saw constructions simply employ a mechanical spring biasing mechanism which tends to counteract changes in the location of the downward force of gravity on the arm. The spring biasing mechanism is normally formed to include some manner for limited adjustment in order to select the rate of drop of the arm. As was set forth hereinabove, however, when the center of gravity of the arm changes substantially due to substantial changes in the cosine of the angle of the arm, control of the rate of descent of the arm becomes very difficult.

Figure 13:
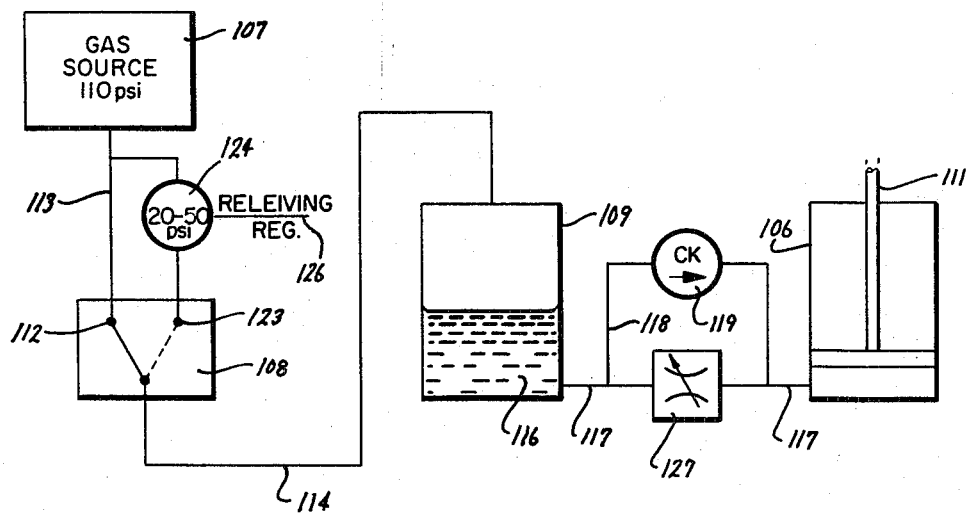
FIG. 13 is a schematic representation of a fluid actuated control mechanism constructed in accordance with the present invention and employed to raise and lower the band saw arm.

It is a further feature of the present invention to provide a fluid activated controlling means which may be used to control the descent of the pivotal arm and thus the cutting characteristics of the saw. As may be seen in FIG. 2, there is a vertical cylinder 106 which extends from platform 32 of the frame and is secured to C-shaped portion 42 of arm 12. This cylinder is used to control the rate of descent and to enable lifting of arm 12. The fluid control means employed may best be understood by reference to FIG. 13 wherein gas source 107 is connected by conduit means to valve 108 and liquid reservoir 109. Further conduit means connect the liquid reservoir to cylinder 106 in which a piston 111 is mounted for reciprocation and is attached to arm 12 as shown in FIGS. 2 and 5. In operation valve 108 is a two-way valve which is switched to position 112 to allow flow of gas from the gas source down conduit 113 and conduit 114 to reservoir 109 is pressurized and flows out of conduit 117, through conduit 118 and check valve 119 to the piston and cylinder. The flow of liquid 116 between the piston and cylinder causes the piston to rise which elevates arm 12. As may be seen in FIGS. 2 and 5, the upward motion of arm 12 may be limited by stop means 121 which can be selectively vertically adjusted on the continuous threaded member 122. Once the arm is brought to a fully elevated position, valve 108 may be switched to position 123 to allow descent of the arm. In the descent mode of the gas-liquid controller, the high pressure gas source 107 is regulated by regulator 124 to have a lower pressure than was required to lift the arm. In addition, regulator 124 is a relieving regulator having a vent conduit 126 which will vent any pressure in reservoir 109 above the regulated preset pressure. If gas source 107 is approximately 110 p.s.i. and the regulator is set to between about 20 to about 50 p.s.i., the high pressure in reservoir 109 will be relieved out the relieving regulator and vent 126 upon switching of valve 108 to position 123. Thus, flow of liquid from cylinder 106 will be possible as the weight of the arm pushes down on piston 111. The flow will be through conduit 117 and liquid metering valve 127, since check valve 119 will now allow a flow from cylinder 106 to reservoir 109. A metered flow rate from the cylinder to the liquid reservoir will result in a controlled descent of the arm 12 effected. The rate of control can be determined by varying the metering 127 and varying the relieving regulator 124. In the event that the pressure over the liquid in the reservoir 109 should drop below the regulator pressure, the regulator will allow flow of gas from gas source 107 into the liquid reservoir to control the pressure therein.

It is preferable that the gas source be a standard compressed air source which would be apart from the band saw illustrated in the drawings, although other gases may be employed. Additionally, liquid 116 is preferably an oil which is not effected by the moisture normally found in compressed air and is resistant to oxidation.

I claim:

1. In a band saw including a frame, a pair of relatively spaced apart wheels rotatably mounted to said frame and formed for receipt and carrying of a continuous loop band saw blade thereon, and guide means including at least one guide member mounted to said frame intermediate said wheels and formed to guide and orient a portion of said saw blade for cutting of a work piece, said guide member being positioned to guide said saw blade before said saw blade advances into contact with said work piece, said guide member further including a plurality of blade engaging elements positioned to engage said blade on both sides thereof and formed for sliding engagement with said saw blade, the improvement comprising:

a coolant channel formed in said guide member and terminating in a discharge opening positioned for discharge of coolant onto the smooth back edge of said saw blade, said discharge opening being positioned and said guide member being adapted for flow of said coolant from said discharge opening over both sides of said saw blade at a position in advance of the first engagement of said saw blade with any of said blade engaging elements in said guide member contacting the sides of said saw blade as said saw blade moves through said guide member.

2. A band saw as defined in claim 1 wherein, said guide member is formed for flow of coolant against the direction of movement of said saw blade during cutting to said position in advance of the first engagement of said saw blade with any of said blade guiding elements to enable lubrication of said saw blade after leaving one of said wheels and before engagement by said blade engaging elements.

\* \* \* \* \*